US011210412B1

(12) United States Patent
Ghetti et al.

(10) Patent No.: US 11,210,412 B1
(45) Date of Patent: Dec. 28, 2021

(54) SYSTEMS AND METHODS FOR REQUIRING CRYPTOGRAPHIC DATA PROTECTION AS A PRECONDITION OF SYSTEM ACCESS

(71) Applicant: Ionic Security Inc., Atlanta, GA (US)

(72) Inventors: Adam Ghetti, Atlanta, GA (US); Ryan Speers, Silver Spring, MD (US); Jeffrey Howard, Arnold, MD (US); Robert McColl, Atlanta, GA (US); Taylor Jay Centers, Annapolis, MD (US); William Monte LeBlanc, Santa Cruz, CA (US)

(73) Assignee: Ionic Security Inc., Atlanta, GA (US)

( * ) Notice: Subject to any disclaimer, the term of this patent is extended or adjusted under 35 U.S.C. 154(b) by 390 days.

(21) Appl. No.: 15/886,527

(22) Filed: Feb. 1, 2018

Related U.S. Application Data

(60) Provisional application No. 62/453,251, filed on Feb. 1, 2017.

(51) Int. Cl.
| | |
|---|---|
| *G06F 7/04* | (2006.01) |
| *H04L 29/06* | (2006.01) |
| *G06F 21/62* | (2013.01) |
| *G06F 21/60* | (2013.01) |
| *H04L 9/08* | (2006.01) |

(52) U.S. Cl.
CPC ............ *G06F 21/62* (2013.01); *G06F 21/604* (2013.01); *H04L 9/0861* (2013.01); *H04L 63/0428* (2013.01); *H04L 63/083* (2013.01); *H04L 63/0876* (2013.01); *H04L 63/10* (2013.01);
(Continued)

(58) Field of Classification Search
CPC .......... H04L 2463/082; H04L 63/0853; H04L 63/10; H04L 9/083; H04L 63/0428; H04L 63/0823; H04L 63/083; H04L 63/20; H04L 9/3234; H04L 9/321; H04L 9/0866; H04L 63/105; H04L 63/12; G06F 21/62; G06F 21/44; G06F 2221/2103; H04W 12/069
See application file for complete search history.

(56) References Cited

U.S. PATENT DOCUMENTS 5,915,025 A 6/1999 Taguchi
5,963,646 A 10/1999 Fielder
(Continued)

OTHER PUBLICATIONS

Constantino, et al., "Towards Enforcing On-The-Fly Policies in BYOD Environments", Information Assurance and Security (IAS), 2013 9th International Conference, IEEE, 2013.

*Primary Examiner* — Lizbeth Torres-Diaz
(74) *Attorney, Agent, or Firm* — Morris, Manning & Martin, LLP; Daniel E. Sineway, Esq.; Adam J. Thompson, Esq.

(57) ABSTRACT

Systems and methods for permitting software presence/configurations to function as a factor in a multi-factor authentication scheme so that a user's access to a different software program/application is conditioned on the presence of certain pre-specified software or software configurations that would otherwise not be necessary for access and/or operation of the different software program/application. Generally, by confirming the presence/configuration of the pre-specified software on a computing device, the system ensures that a user, in one embodiment, may only access the different software program/application with the proper configuration of the pre-specified software.

31 Claims, 6 Drawing Sheets

EXEMPLARY SYSTEM OVERVIEW

(52) U.S. Cl.
CPC ........ *H04L 63/20* (2013.01); *H04L 2463/082* (2013.01)

(56) References Cited

U.S. PATENT DOCUMENTS

| | | | |
|---|---|---|---|
| 6,565,609 B1 | 5/2003 | Sorge | |
| 6,904,521 B1* | 6/2005 | Jivsov | H04L 51/30 713/155 |
| 7,636,439 B2 | 12/2009 | Nakabayashi | |
| 8,352,743 B2* | 1/2013 | Tsuruoka | G06F 21/33 713/176 |
| 8,442,527 B1* | 5/2013 | Machiraju | H04W 12/069 455/435.1 |
| 8,495,709 B1 | 7/2013 | Cooper | |
| 8,819,437 B2* | 8/2014 | Wittenberg | H04L 9/3271 713/172 |
| 9,058,495 B2 | 6/2015 | Brannon | |
| 9,224,000 B1* | 12/2015 | Ghetti | H04L 63/0478 |
| 9,614,670 B1* | 4/2017 | Ghetti | G06F 21/602 |
| 9,729,539 B1* | 8/2017 | Agrawal | H04L 63/0815 |
| 9,749,310 B2* | 8/2017 | Li | G06F 21/41 |
| 9,853,977 B1* | 12/2017 | Laucius | H04L 9/321 |
| 10,116,644 B1* | 10/2018 | Agrawal | H04L 63/0815 |
| 10,250,584 B2 | 4/2019 | Mikheev | H04W 4/60 |
| 10,462,121 B2* | 10/2019 | Li | G06F 21/44 |
| 2002/0002688 A1* | 1/2002 | Gregg | H04L 63/08 726/3 |
| 2002/0031225 A1 | 3/2002 | Hines | |
| 2003/0046589 A1* | 3/2003 | Gregg | H04L 63/0823 726/5 |
| 2003/0172272 A1* | 9/2003 | Ehlers | H04L 63/18 713/170 |
| 2004/0073617 A1 | 4/2004 | Milliken | |
| 2004/0098348 A1 | 5/2004 | Kawasaki | |
| 2004/0101141 A1 | 5/2004 | Alve | |
| 2004/0151323 A1 | 8/2004 | Olkin | |
| 2005/0071280 A1* | 3/2005 | Irwin | H04L 63/065 705/59 |
| 2006/0010324 A1 | 1/2006 | Appenzeller | |
| 2007/0174613 A1 | 7/2007 | Paddon | |
| 2007/0219915 A1 | 9/2007 | Hatano | |
| 2007/0271459 A1 | 11/2007 | Gomez | |
| 2008/0046718 A1 | 2/2008 | Grab | |
| 2008/0077806 A1 | 3/2008 | Cui | |
| 2008/0130902 A1 | 6/2008 | Foo Kune | |
| 2009/0296926 A1 | 12/2009 | Perlman | |
| 2010/0005509 A1 | 1/2010 | Peckover | |
| 2010/0042838 A1 | 2/2010 | Ho | |
| 2010/0095127 A1 | 4/2010 | Banerjee | |
| 2011/0145571 A1 | 6/2011 | Schmidt-Karaca | |
| 2012/0185612 A1 | 7/2012 | Zhang | |
| 2013/0024688 A1 | 1/2013 | Wen | |
| 2013/0086657 A1* | 4/2013 | Srinivasan | H04L 9/3234 726/6 |
| 2013/0097421 A1 | 4/2013 | Lim | |
| 2013/0208893 A1* | 8/2013 | Shablygin | H04L 9/3213 380/277 |
| 2013/0298202 A1 | 11/2013 | Warshavsky | |
| 2013/0312079 A1* | 11/2013 | McCallum | G06F 21/335 726/10 |
| 2014/0025786 A1* | 1/2014 | Gage | H04L 67/20 709/219 |
| 2014/0181925 A1* | 6/2014 | Smith | H04L 63/08 726/6 |
| 2014/0215590 A1 | 7/2014 | Brand | |
| 2014/0281491 A1* | 9/2014 | Zaverucha | H04L 63/0421 713/155 |
| 2014/0337930 A1* | 11/2014 | Hoyos | G06F 21/34 726/4 |
| 2015/0033028 A1* | 1/2015 | Dietrich | H04L 9/3247 713/178 |
| 2015/0046707 A1* | 2/2015 | Atherton | G06Q 20/3825 713/168 |
| 2015/0101012 A1 | 4/2015 | White | |
| 2015/0200958 A1 | 7/2015 | Muppidi | |
| 2016/0005032 A1* | 1/2016 | Yau | G06Q 20/38215 705/69 |
| 2016/0036588 A1* | 2/2016 | Thackston | G07F 17/3241 713/168 |
| 2016/0044511 A1* | 2/2016 | Broch | H04L 63/20 726/4 |
| 2016/0086176 A1* | 3/2016 | Silva Pinto | G06Q 20/321 705/44 |
| 2016/0112397 A1* | 4/2016 | Mankovskii | H04L 63/105 726/6 |
| 2016/0134599 A1* | 5/2016 | Ross | H04L 63/08 713/168 |
| 2016/0285858 A1* | 9/2016 | Li | H04L 63/0815 |
| 2016/0286393 A1* | 9/2016 | Rasheed | H04L 63/18 |
| 2017/0237568 A1* | 8/2017 | Morris | H04L 9/3239 713/168 |
| 2018/0131685 A1* | 5/2018 | Sridhar | H04L 67/28 |
| 2020/0076835 A1* | 3/2020 | Ladnai | H04L 63/1433 |

* cited by examiner

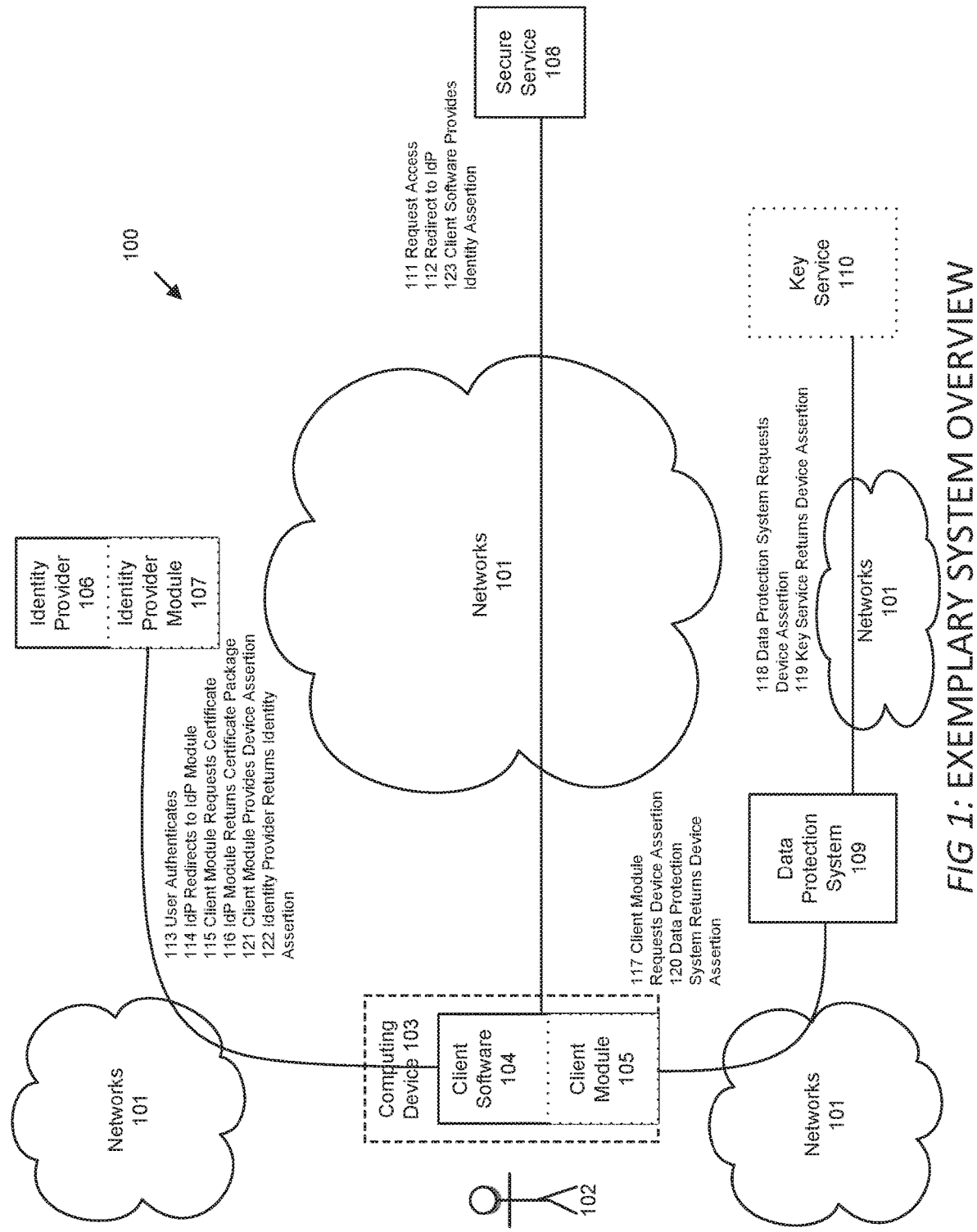
FIG 1: EXEMPLARY SYSTEM OVERVIEW

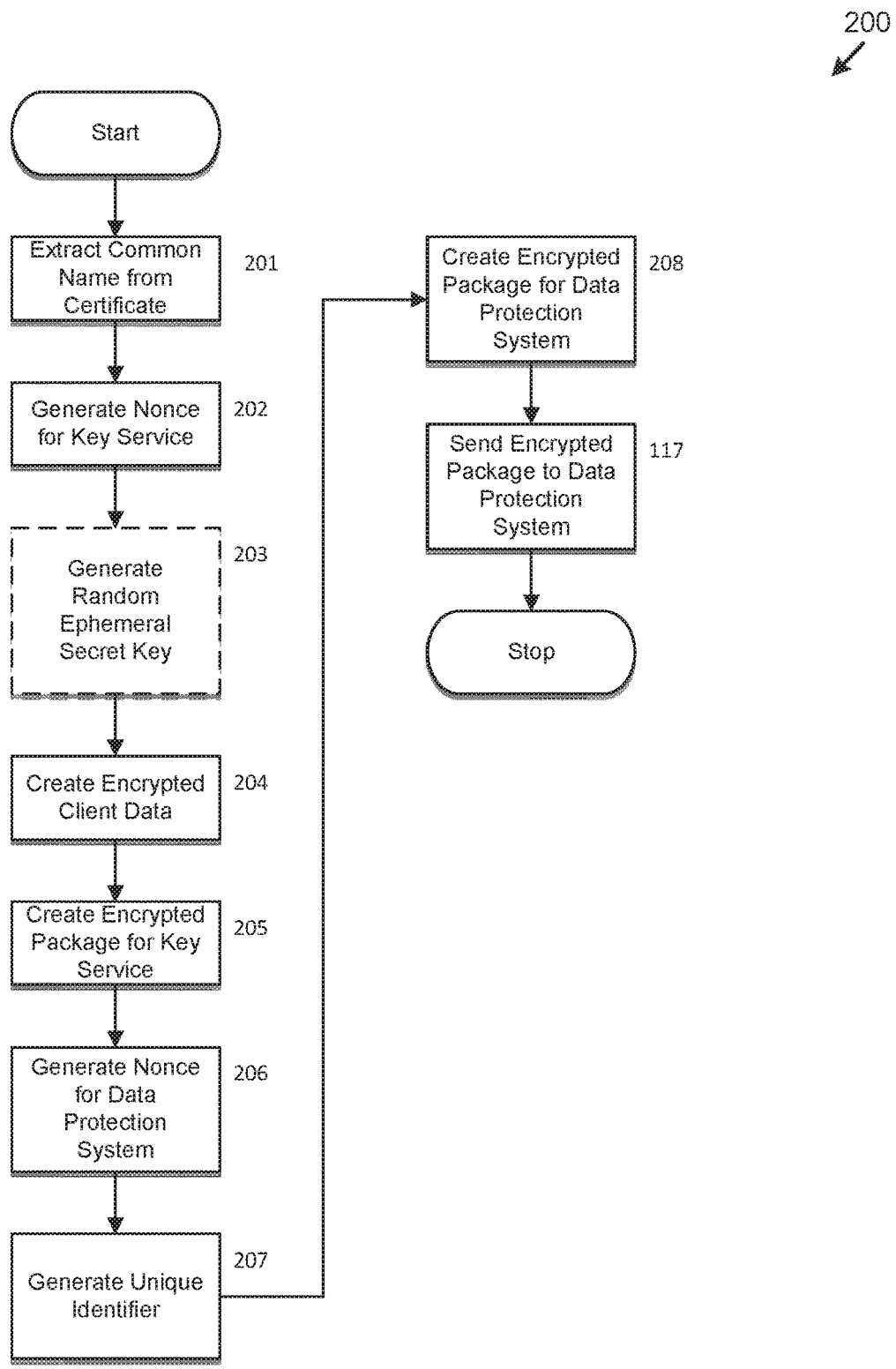
FIG 2: EXEMPLARY CLIENT MODULE PROCESS

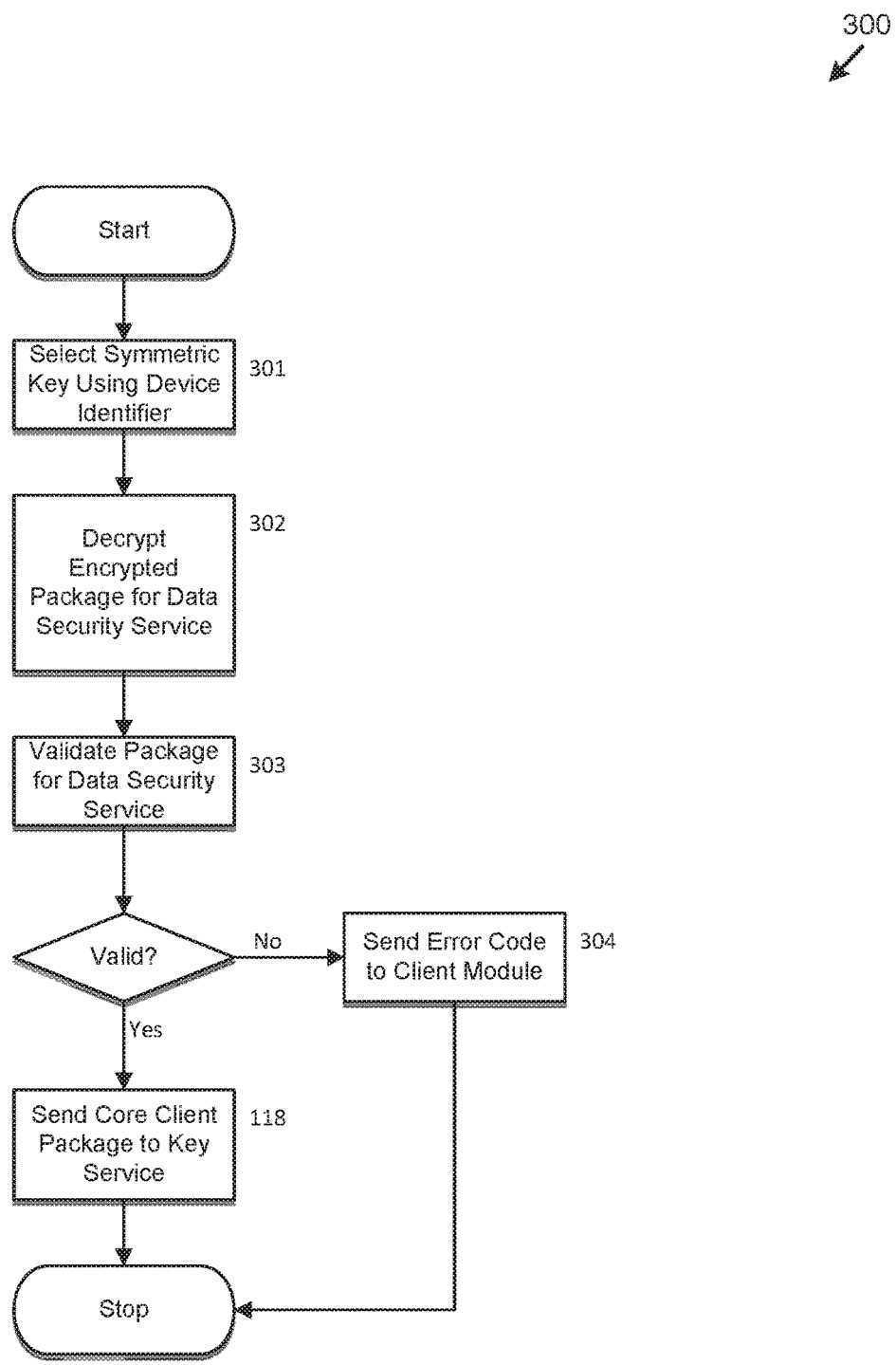
FIG 3: EXEMPLARY DATA PROTECTION SYSTEM PROCESS

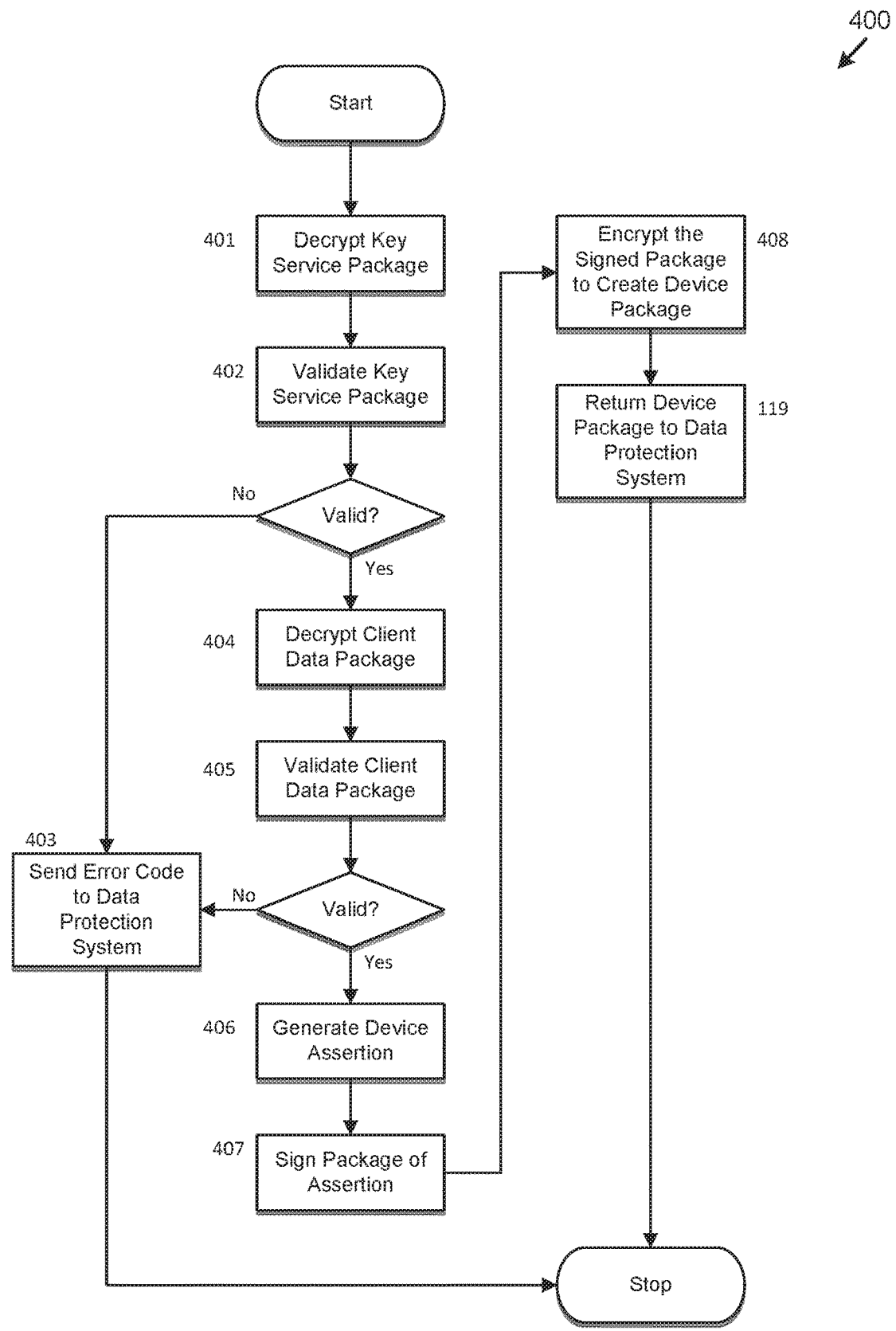
FIG 4: EXEMPLARY KEY SERVICE PROCESS

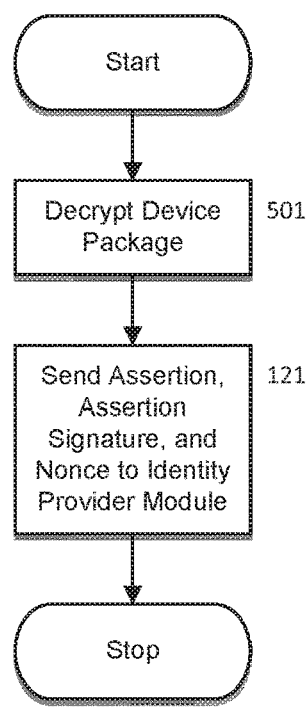
FIG 5: EXEMPLARY CLIENT MODULE PROCESS

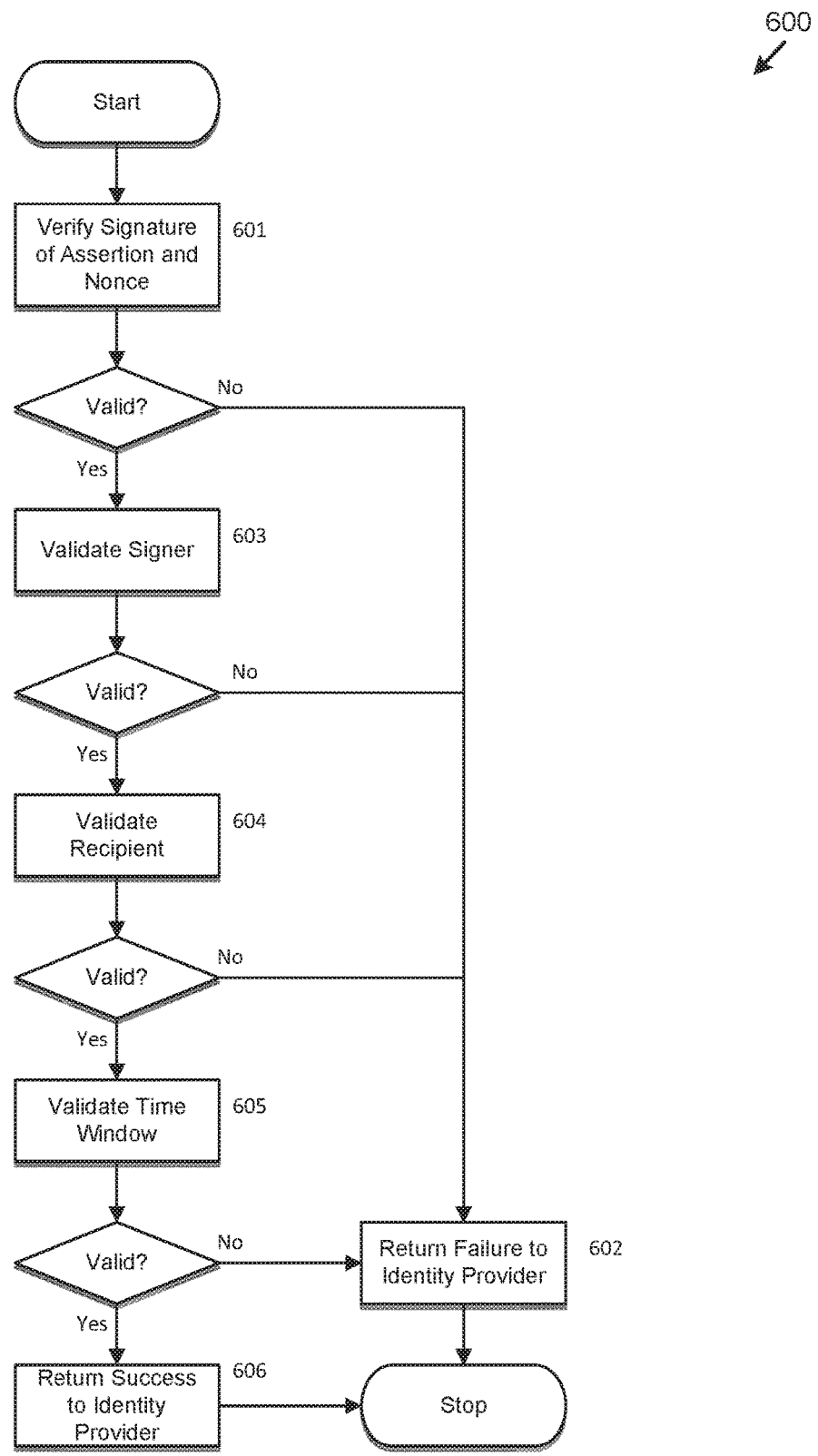
FIG 6: EXEMPLARY IDENTITY PROVIDER MODULE PROCESS

SYSTEMS AND METHODS FOR REQUIRING CRYPTOGRAPHIC DATA PROTECTION AS A PRECONDITION OF SYSTEM ACCESS

CROSS REFERENCE TO RELATED APPLICATIONS

This application claims the benefit of and priority to U.S. Provisional Patent Application No. 62/453,251, entitled "Systems and Methods for Requiring Cryptographic Data Protection as a Precondition of System Access", filed on Feb. 1, 2017, the disclosure of which is incorporated by reference in its entirety as if the same were fully set forth herein.

TECHNICAL FIELD

The present systems and methods relate generally to controlling access to shared services, and more particularly, to systems and methods that permit the conditioning of access to a secure service based on the presence and operation of a data protection system in a cryptographically secure manner.

BACKGROUND

Modern information technology offers a growing number of tools and services to increase business productivity, including mobile devices, browser-based web applications, and cloud computing and storage. However, each new capability brings new risks. Many of these tools and services require storing sensitive information in new locations such as cloud data repositories, software as a service applications, and mobile devices. Advanced collaboration tools create new modalities of data access for legitimate users, but they also create exploitable security vulnerabilities that allow loss or theft of data.

Many providers of shared systems, to include infrastructure as a service, cloud data storage, and software as a service applications, devote considerable time, effort, and resources to securing data while it is in their care and control. Once sensitive information leaves the provider's system, their security controls no longer apply, potentially leaving the data unprotected. As one example, consider sensitive data stored in a cloud-based Customer Relationship Management (CRM) system. As long as the data remains in the CRM system, it may be adequately protected, but if a user exports the data to a spreadsheet, then the cloud service's security controls may not protect the spreadsheet file, which may be used or forwarded inappropriately.

Therefore, there is a long-felt but unresolved need for a system, apparatus, or method that requires users to have an installed, properly configured, and operating data protection/encryption system as a prerequisite to being allowed access to systems containing sensitive data.

BRIEF SUMMARY OF THE DISCLOSURE

Briefly described, and according to one embodiment, aspects of the present disclosure generally relate to systems and methods that permit the conditioning of access to a third-party service based on the presence and operation of a data protection system in a cryptographically secure manner.

In various embodiments, the systems and methods disclosed herein permit software presence/configurations to function as a factor in a multi-factor authentication scheme so that a user's access to a different software program/application is conditioned on the presence of certain pre-specified software or software configurations that would otherwise not be necessary for access to and/or operation of the different software program/application. For example, an employee may attempt to access a software program/application that contains sensitive data that is relevant to the employer's business (and the employee's role with employer), and the disclosed system may permit/deny access to the employee depending on whether the employee's electronic computing device (e.g., laptop, tablet, cellphone, etc.) is operating certain data protection software (e.g., an encryption software, etc.) with certain configurations. In one embodiment, the software program and/or application that the employee is attempting to access may be a third party software that the employer has little to no control over, at least with respect to the form of the underlying data (e.g., encrypted vs. unencrypted, etc.) within the software (e.g., customer relationship management software, file sharing/collaboration software, etc.). In one embodiment, the software program and/or application that the employee is attempting to access may be a third party software that operates remotely or virtually (e.g., in the cloud, etc.) (e.g., software as a service, etc.) or in some other manner such that employer cannot control whether the employee can access the software from a personal or work electronic computing device. In various embodiments, the employer may want to condition access to the third party software on whether the employee is accessing the third party software from an electronic computing device that is configured with a data protection software/system deployed by the employer. Thus, the employer may prevent the employee from accessing the third party software without the presence of the data protection software that would control the employee's access to the data within the third party software in accordance with the employer's policies.

Generally, a data protection system may encrypt data and manage access to data for a particular user, enterprise, and/or organization (exemplary versions of which are described in U.S. Pat. No. 9,224,000, entitled "Systems and Methods for providing Information Security Using Context-Based Keys," and U.S. patent application Ser. No. 15/017,255, filed Feb. 5, 2016, entitled "Systems and Methods for Encryption and Provision of Information Security Using Platform Services," the disclosures of which are incorporated by reference herein) such that data within the system may not leave the system without being encrypted. Such an encryption system may, in various embodiments, protect data immediately upon its removal from a secure shared service (e.g., third party software, etc.), limiting access to users who satisfy pre-defined policies based on the context of the user's consumption of the data, such as device, time of day, and location. However, such a control is generally effective only if the system is in place and operating correctly at the time a user exports data from the secure shared service. Thus, if a malicious user were to log into the secure shared service in a manner that bypassed the system (e.g., on an electronic computing device that was not configured with the data protection system), he or she would be able to export sensitive data in a plaintext form, subverting the intended security control.

In one embodiment, the disclosed system comprises a data protection system that may operate on electronic computing devices (e.g., using client modules, etc.) to protect data through a combination of encryption and limited access. Generally, when a user attempts to access a particular software application or program, the software may be configured to require that the user confirm the presence/current configuration of the data protection system on the user's electronic computing device. In one embodiment, the software may request such confirmation from an identity provider (e.g., a software service used to authenticate the user to multiple software application or programs based on a single set of credentials). In various embodiments, the identity provider may be configured to either confirm the presence/configuration of the data protection system on its own (e.g., based on the presence of certain certificates or other data) or to request confirmation from the electronic computing device that it is operating the correct configuration of the data protection system. If the identity provider requests confirmation from the electronic computing device, then, in various embodiments, the electronic computing device may be configured to either confirm the presence/configuration of the data protection system on its own (e.g., based on the presence of certain certificates or other data) or to request confirmation from the data protection system that it is operating the correct configuration of the data protection system.

If, in one embodiment, the electronic computing device is configured to request confirmation from the data protection system that it is operating the correct configuration of the data protection system, then the electronic computing device may, after a user attempts to log into a secured third party software, receive a request from the identity provider to do the same. Thus, in one embodiment, the electronic computing device requests confirmation from the data protection system that it is operating the appropriate software/configuration. In one embodiment, the data protection system may provide to the electronic computing device a unique, cryptographically-secure package that the electronic computing device may provide to the identity provider to confirm the presence/configuration of the data protection system. Generally, if the electronic computing device provides the appropriate confirmation, then the user will be permitted access to the secured third party software. If, however, the appropriate confirmation is not received, then the identity provider may be configured to take certain actions (e.g., deny access to the third party software, limit access to the same, monitor access and log all activity, notify security personnel, etc.).

Accordingly, the systems and methods of the present disclosure improve the fields of authentication and data security by, in one embodiment, requiring a user/electronic computing device confirm the presence of current software operating or installed on the electronic computing device before permitting access to a secured third party software, as part of a multi-factor authentication, which increases the security of the data in the secured third party software. In one embodiment, the current software may be data protection software, as described and disclosed herein, that applies security policies, facilitates encryption/decryption of data, etc.

In one embodiment, a method for providing access to a secured service, comprising the steps of: initiating, from an electronic computing device, a multi-factor authentication request to gain access to a secured software service, wherein one factor of the multi-factor authentication request comprises an assertion that a data protection software is operational on the electronic computing device; initiating and transmitting a validation request from the electronic computing device to a third party system to confirm the assertion that the data protection software is in fact operational on the electronic computing device; receiving a confirmation indication at the electronic computing device from the third party system confirming the assertion that the data protection software is in fact operational on the electronic computing device; and transmitting the confirmation indication to the secured software service to validate the one factor of the multi-factor authentication request and enable access of the electronic computing device to the secured software service.

In one embodiment, a system, comprising: an electronic computing device that transmits a request for access to a secured service; the secured service that receives the request for access, wherein the secured service redirects the electronic computing device to an identity provider for confirmation of the presence of a data protection system protecting data on the electronic computing device; the identity provider that transmits a request for confirmation of the presence of the data protection system to the electronic computing device; the electronic computing device that receives the request for confirmation from the identity provider, wherein the electronic computing device transmits to the data protection system a request for a first assertion of the presence of the data protection system; the data protection system that receives the request for the first assertion from the electronic computing device, wherein the data protection system confirms the presence of the data protection system and transmits the first assertion to the electronic computing device; the electronic computing device that receives the first assertion from the data protection system, wherein the electronic computing device transmits the first assertion to the identity provider; the identity provider that receives the first assertion from the electronic computing device, wherein the identity provider determines that the first assertion confirms the presence of the data protection system and transmits a second assertion to the electronic computing device that will enable access to the secured service by the electronic computing device; the electronic computing device that receives the second assertion, wherein the electronic computing device transmits the second assertion to the secured service; and the secured service that receives the second assertion from the electronic computing device, wherein the secured service, based on the second assertion, provides access to the secured service by the electronic computing device.

In one embodiment, a method, comprising the steps of: transmitting a request for access to a secured service; receiving the request for access to the secured service and redirecting to an identity provider for confirmation of the presence of a data protection system protecting data on the electronic computing device; transmitting a request for confirmation of the presence of the data protection system; receiving the request for confirmation and transmitting a request for a first assertion of the presence of the data protection system; receiving the request for the first assertion, confirming the presence of the data protection system, and transmitting the first assertion; receiving the first assertion and transmitting the first assertion; receiving the first assertion, determining that the first assertion confirms the presence of the data protection system, and transmitting a second assertion that will enable access to the secured service by the electronic computing device; receiving the second assertion and transmitting the second assertion to the secured service; and receiving the second assertion and, based on the second assertion, providing access to the secured service.

In one embodiment, a method, comprising the steps of: receiving a request from an electronic computing device to access a secured service; requesting confirmation of the presence on the electronic computing device of a data protection system for protecting data; receiving an assertion of the presence on the electronic computing device of the data protection system; validating that the assertion confirms the presence on the electronic computing device of the data protection system; and providing access to the secured service via the electronic computing device.

In one embodiment, a system, comprising: an electronic computing device that transmits a request for access to a secured service; the secured service that receives the request for access, wherein the secured service transmits to the electronic computing device a request for confirmation of the presence of a data protection system protecting data on the electronic computing device; the electronic computing device that receives the request for confirmation from the secured service, wherein the electronic computing device transmits to the data protection system a request for an assertion of the presence of the data protection system; the data protection system that receives the request for the assertion from the electronic computing device, wherein the data protection system confirms the presence of the data protection system and transmits the assertion to the electronic computing device; the electronic computing device that receives the assertion from the data protection system, wherein the electronic computing device transmits the assertion to the secured service; and the secured service that receives the assertion from the electronic computing device, wherein the secured service determines that the assertion confirms the presence of the data protection system and provides access to the secured service by the electronic computing device.

According to one aspect of the present disclosure, the method, wherein another factor of the multi-factor authentication request comprises a user name and a password. Furthermore, the method, wherein initiating and transmitting the validation request further comprises providing the another factor of the multi-factor authentication request to the third party system. Moreover, the method, wherein the third party system comprises an identity provider. Further, the method, wherein the third party system comprises a data protection system corresponding to the data protection software. Additionally, the method, after initiating and transmitting the validation request but before receiving the confirmation indication, further comprising the steps of: receiving, from the third party system, a request for the assertion that the data protection software is in fact operational on the electronic computing device; transmitting, to the data protection system, the request for the assertion that the data protection software is in fact operational on the electronic computing device; receiving, from the data protection system, the assertion that the data protection software is in fact operational on the electronic computing device; and transmitting, to the third party system, the assertion that the data protection software is in fact operational on the electronic computing device.

According to one aspect of the present disclosure, the system of, wherein the identity provider, prior to transmitting the request for confirmation, authenticates the electronic computing device. Also, the system, wherein the request for the first assertion comprises a device identifier corresponding to the electronic computing device, unique cryptographic information, and/or an identity provider identifier corresponding to the identity provider. Furthermore, the system, wherein the request for the first assertion is encrypted by the electronic computing device prior to transmission to the data protection system. Moreover, the system, wherein the data protection system, after confirming the presence of the data protection system, generates the first assertion. Further, the system, wherein the first assertion comprises the identity provider identifier, a data protection system identifier corresponding to the data protection system, and/or a validity time-range corresponding to the first assertion. Additionally, the system, wherein the first assertion is encrypted by the data protection system prior to transmission to the electronic computing device. Also, the system, wherein the identity provider, to determine that the first assertion confirms the presence of the data protection system, determines that the identity provider identifier is valid, that the data protection system identifier is valid, and that the current time is within the validity time-range.

According to one aspect of the present disclosure, the method, further comprising the step of, prior to transmitting the request for confirmation, authenticating the electronic computing device. Furthermore, the method, wherein the request for the first assertion comprises a device identifier corresponding to the electronic computing device, unique cryptographic information, and an identity provider identifier corresponding to the identity provider. Moreover, the method, wherein the request for the first assertion is encrypted prior to transmission. Further, the method, wherein the first assertion comprises the identity provider identifier, a data protection system identifier corresponding to the data protection system, and a validity time-range corresponding to the first assertion. Additionally, the method, wherein the first assertion is encrypted prior to transmission. Also, the method, wherein determining that the first assertion confirms the presence of the data protection system further comprises determining that the identity provider identifier is valid, that the data protection system identifier is valid, and that the current time is within the validity time-range.

According to one aspect of the present disclosure, the method, wherein the secured service performs the step of requesting confirmation of the presence of the data protection system for protecting data on the electronic computing device. Furthermore, the method, wherein an identity provider performs the step of requesting confirmation of the presence of the data protection system for protecting data on the electronic computing device. Moreover, the method, wherein the presence of the data protection system comprises a SDK. Further, the method, wherein the SDK comprises a JavaScript SDK. Additionally, the method, wherein the presence of the data protection system comprises a plugin installed in an internet browser on the electronic computing device. Also, the method, wherein the presence of the data protection system comprises an up-to-date and operational version of the data protection system.

According to one aspect of the present disclosure, the system, wherein the secured service, after receiving the request for access, authenticates the electronic computing device. Furthermore, the system, wherein the request for the first assertion comprises a device identifier corresponding to the electronic computing device, unique cryptographic information, and a secured service identifier corresponding to the secured service. Moreover, the system, wherein the request for the first assertion is encrypted by the electronic computing device prior to transmission to the data protection system. Further, the system, wherein the data protection system, after confirming the presence of the data protection system, generates the first assertion. Additionally, the system, wherein the first assertion comprises the secured service identifier, a data protection system identifier corresponding to the data protection system, and a validity time-range corresponding to the first assertion. Also, the system, wherein the first assertion is encrypted by the data protection system prior to transmission to the electronic computing device. Furthermore, the system, wherein the secured service, to determine that the first assertion confirms the presence of the data protection system, determines that the secured service identifier is valid, that the data protection system identifier is valid, and that the current time is within the validity time-range.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary, high-level overview of one embodiment of the disclosed system.

FIG. 2 illustrates an exemplary process for a client module to create a cryptographically secure request for a data protection system to validate the presence of the client module, according to one embodiment of the present disclosure.

FIG. 3 illustrates an exemplary process for a data protection system to validate a cryptographically secure request from a client module and pass that request to a key service, according to one embodiment of the present disclosure.

FIG. 4 illustrates an exemplary process for a key service to validate a cryptographically secure request from a client module to assert its presence on a client device and to prepare a response with that assertion, according to one embodiment of the present disclosure.

FIG. 5 illustrates an exemplary process for a client module to receive an assertion about its presence from a data protection system and to forward that assertion to an identity provider module, according to one embodiment of the present disclosure.

FIG. 6 illustrates an exemplary process for an identity provider module to verify a cryptographically secure assertion that a client module is installed and operating on a computing device and appropriately condition the success of a user's authentication with the identity provider, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods that permit the conditioning of access to a third-party service based on the presence and operation of a data protection system in a cryptographically secure manner.

In various embodiments, the systems and methods disclosed herein permit software presence/configurations to function as a factor in a multi-factor authentication scheme so that a user's access to a different software program/application is conditioned on the presence of certain pre-specified software or software configurations that would otherwise not be necessary for access to and/or operation of the different software program/application. For example, an employee may attempt to access a software program/application that contains sensitive data that is relevant to the employer's business (and the employee's role with employer), and the disclosed system may permit/deny access to the employee depending on whether the employee's electronic computing device (e.g., laptop, tablet, cellphone, etc.) is operating certain data protection software (e.g., an encryption software, etc.) with certain configurations. In one embodiment, the software program and/or application that the employee is attempting to access may be a third party software that the employer has little to no control over, at least with respect to the form of the underlying data (e.g., encrypted vs. unencrypted, etc.) within the software (e.g., customer relationship management software, file sharing/collaboration software, etc.). In one embodiment, the software program and/or application that the employee is attempting to access may be a third party software that operates remotely or virtually (e.g., in the cloud, etc.) (e.g., software as a service, etc.) or in some other manner such that employer cannot control whether the employee can access the software from a personal or work electronic computing device. In various embodiments, the employer may want to condition access to the third party software on whether the employee is accessing the third party software from an electronic computing device that is configured with a data protection software/system deployed by the employer. Thus, the employer may prevent the employee from accessing the third party software without the presence of the data protection software that would control the employee's access to the data within the third party software in accordance with the employer's policies.

Generally, a data protection system may encrypt data and manage access to data for a particular user, enterprise, and/or organization (exemplary versions of which are described in U.S. Pat. No. 9,224,000, entitled "Systems and Methods for providing Information Security Using Context-Based Keys," and U.S. patent application Ser. No. 15/017,255, filed Feb. 5, 2016, entitled "Systems and Methods for Encryption and Provision of Information Security Using Platform Services," the disclosures of which are incorporated by reference herein) such that data within the system may not leave the system without being encrypted. Such an encryption system may, in various embodiments, protect data immediately upon its removal from a secure shared service (e.g., third party software, etc.), limiting access to users who satisfy pre-defined policies based on the context of the user's consumption of the data, such as device, time of day, and location. However, such a control is generally effective only if the system is in place and operating correctly at the time a user exports data from the secure shared service. Thus, if a malicious user were to log into the secure shared service in a manner that bypassed the system (e.g., on an electronic computing device that was not configured with the data protection system), he or she would be able to export sensitive data in a plaintext form, subverting the intended security control.

In one embodiment, the disclosed system comprises a data protection system that may operate on electronic computing devices (e.g., using client modules, etc.) to protect data through a combination of encryption and limited access. Generally, when a user attempts to access a particular software application or program, the software may be configured to require that the user confirm the presence/current configuration of the data protection system on the user's electronic computing device. In one embodiment, the software may request such confirmation from an identity provider (e.g., a software service used to authenticate the user to multiple software application or programs based on a single set of credentials). In various embodiments, the identity provider may be configured to either confirm the presence/configuration of the data protection system on its own (e.g., based on the presence of certain certificates or other data) or to request confirmation from the electronic computing device that it is operating the correct configuration of the data protection system. If the identity provider requests confirmation from the electronic computing device, then, in various embodiments, the electronic computing device may be configured to either confirm the presence/configuration of the data protection system on its own (e.g., based on the presence of certain certificates or other data) or to request confirmation from the data protection system that it is operating the correct configuration of the data protection system.

If, in one embodiment, the electronic computing device is configured to request confirmation from the data protection system that it is operating the correct configuration of the data protection system, then the electronic computing device may, after a user attempts to log into a secured third party software, receive a request from the identity provider to do the same. Thus, in one embodiment, the electronic computing device requests confirmation from the data protection system that it is operating the appropriate software/configuration. In one embodiment, the data protection system may provide to the electronic computing device a unique, cryptographically-secure package that the electronic computing device may provide to the identity provider to confirm the presence/configuration of the data protection system. Generally, if the electronic computing device provides the appropriate confirmation, then the user will be permitted access to the secured third party software. If, however, the appropriate confirmation is not received, then the identity provider may be configured to take certain actions (e.g., deny access to the third party software, limit access to the same, monitor access and log all activity, notify security personnel, etc.).

Exemplary Embodiments

Referring now to the figures, for the purposes of example and explanation of the fundamental processes and components of the disclosed systems and methods, reference is made to FIG. 1, which illustrates an exemplary, high-level overview 100 of one embodiment of the disclosed system. As will be understood and appreciated, the exemplary, high-level overview 100 shown in FIG. 1 represents merely one approach or embodiment of the present system, and other aspects are used according to various embodiments of the present system. Generally, by way of example, and not by way of limitation, a high-level overview of actions involved in an exemplary access to a secure service is shown in FIG. 1 with the help of sequence numbered steps. As will be understood by one having ordinary skill in the art, the steps and processes shown in FIG. 1 (and those of all other flowcharts and sequence diagrams shown and described herein) may operate concurrently and continuously, are generally asynchronous and independent, and are not necessarily performed in the order shown or required to be performed at all.

In the example shown in FIG. 1, a user 102 wishes to log into a secure service 108 using some client software 104 (e.g., a pre-existing, off-the-shelf software product such as an internet browser, etc.) operating on an electronic computing device 103 (e.g., laptop computer, desktop computer, tablet, smartphone, etc.). Generally, the secure service 108 may be any third party software operating in any location or manner and may comprise sensitive data in any format (e.g., unencrypted, etc.) that an entity, such as the user's employer, wishes to protect. For example, the secure service 108 may operate as software as a service in the cloud (e.g., customer relationship management software like SALESFORCE®, etc.). Thus, to access the secure service 108, in one embodiment, the system must determine that the user's computing device 103 is operating a current configuration of a data protection system 109. To further understand the system, a brief explanation of the system's architecture and the components thereof are discussed below.

In various embodiments, the data protection system 109 operates on the computing device 103 of the user 102 as a client module or software development kit (e.g., SDK, JavaScript SDK, etc.) 105. Generally, in various embodiments, the systems and methods disclosed herein comprise the client module/SDK 105 that operates inside a computing device of a user 103, an identity provider 106, an identity provider module 107, a data protection system 109, and the key service 110 the data protection system 109 uses to store encryption keys. In one embodiment, all of these components are connected by one or more networks 101. Generally, the client module/SDK 105, identity provider module 107, data protection system 109, and key service 110 comprise proprietary software algorithms, modules, or applications to perform the functionalities of ensuring the presence of a data protection system prior to allowing login to the secure service 108. As will occur to one having ordinary skill in the art, in various embodiments, the secure service 108, identity provider 106, and client software 104 may be off-the-shelf products capable of performing the functionality described herein. In one embodiment, the data protection system 109 may be any system capable of performing the functionality disclosed herein.

As shown in FIG. 1, the client software 104 and client module/SDK 105 communicate with the identity provider 106, identity provider module 107, secure service 108, and data protection system 109 via networks 101. Similarly, the data protection system 109 communicates with the key service 110 via networks 101 as well. As will be understood and appreciated, this may be one or many networks, including a corporate Local Area Network (LAN) or Wide Area Network (WAN), a cellular data network, or the public Internet. Various networking components, such as routers, switches, and hubs are typically involved in the communications. Although not shown in FIG. 1, it can also be further understood that such communications may include one or more secure networks, gateways, or firewalls that provide additional security from unwanted intrusions and cyber attacks. Communications may also include load balancers or other network devices designed to provide for scalability and performance gains.

In one embodiment, the client software 104 and client module/SDK 105 run on users' electronic devices 103 (e.g. desktop computers, laptop computers, cellular phones, mobile devices, tablet PCs, or any other device capable of accessing a network or the Internet). The client software 104 may generally be any software product that is used to access a service through the network, such as a web browser. In one embodiment, the client module/SDK 105 is a proprietary software program (e.g., a browser plugin) that runs transparently to the user whenever the client software 104 operates. In one embodiment, the client module/SDK 105 functions as an extension of the data protection system 109 providing local (to the computing device 103) functionality of the data protection system 109 (e.g., enforcement of policies, encryption/decryption of data, requesting encryption keys, etc.). Although not shown in FIG. 1, the client module/SDK 105 performs other functions as well, which may include control over application entitlements (e.g., which users may perform which functions within the system, such as printing files, copying text, etc.) or encryption of data, in this example including the export of sensitive data from the secure service 108. In one embodiment, the client module/SDK 105 may not be pre-existing on users' electronic devices 103; instead, the client module/SDK 105 may be loaded as part of the client software's 104 activity with the identity provider 106, identity provider module 107, and/or secure service 108.

In one embodiment, the identity provider 106 is a system that provides identity and authentication as a service. In the absence of an identity provider 106, end users 102 generally establish and remember unique login credentials, such as a username and password, for every secure service 108 they use. An identity provider 106 allows users to remember only a single set of credentials for the identity provider itself. Secure services 108 then trust the identity provider to authenticate the user on their behalf. Such systems are often called Single Sign On (SSO) services, because they allow users to sign on with the identity provider 106 once and then use multiple secure services 108. In order to facilitate interoperability among identity providers 106 and secure services 108, there are standard SSO protocol standards, such as Security Assertion Markup Language (SAML) based authentication and OAuth. In another embodiment, the identity provider module 107 might be combined with the secure service 108, omitting the identity provider 106 entirely, reflecting a system in which the secure service 108 itself validates the presence of the client module/SDK 105 as part of a login sequence. In one embodiment, the client module/SDK 105 may similarly function as the identity provider 106 and validate its presence with the secure service 108.

Identity providers 106 often allow for the configuration of a flexible set of options for authenticating users. A basic authentication mechanism might rely on a username and password that the end user 102 remembers. A more secure authentication configuration would also require the user to type in a code generated by a separate hardware device. Another might require some form of biometric identification, such as a fingerprint scan. Multi-factor authentication (MFA), the requirement that a user 102 provide multiple, independent pieces of evidence to establish trust in his or her identity, is a method of increasing security by reducing the risk of a malicious attacker impersonating a legitimate user. If any one factor is incorrect, the identity provider can refuse to assert the validity of the user's 102 identity, causing the secure service 108 to deny access to the user 102.

In various embodiments, the identity provider module 107 is a proprietary software program that runs as a plugin to an identity provider 106. In one embodiment, configuration of the data protection system 109 comprises configuring the identity provider 106 with the identity provider module 107. The identity provider module is generally responsible for interacting with the client module/SDK 105 in order to ensure that the client module/SDK 105 is installed on the end user's 102 computing device 103 and operational. In essence, the identity provider 106 treats the identity provider module 107 as providing another factor in a multi-factor authentication scheme. However, in reality, the identity provider module 107 is validating the presence and operation of a client module/SDK 105 on the end user's 102 computing device 103. As explained in detail below, in one embodiment, only if there is an installed and operational client module/SDK 105 on an end user's computing device does the identity provider module 107 indicate success to the identity provider 107. Otherwise, the result is analogous to a failed authentication step, denying the user 102 access to the secure service 108, generating a report or alert, inserting software onto the user's computing device 103 (e.g., tracking software, etc.), etc. In an alternative exemplary system, the presence of a client module/SDK 105 could be the only factor considered in determining whether to permit access to the secure service 108.

The data protection system 109 is principally responsible for the protection of data through enforcement of security policies, encryption/decryption of data, etc. Though not shown in FIG. 1, in one scenario the client module/SDK 105 requests encryption keys from the data protection system 109 in order to protect data upon export from the secure service 108. Encryption of data upon export from the secure service 108 is generally only an effective control if every end user 102 must have a client module/SDK 105 installed and operational when exporting data from the secure service 108. If an end user 102 is able to log into the secure service 108 without a client module/SDK 105, that user 102 would be able to export data without applying encryption, which could then be forwarded to unauthorized recipients or otherwise used in a inappropriate manner.

In various embodiments, the key service 110 is responsible for storing and providing encryption keys for the protection of data. The key service 110 is generally separated from the data protection system 109 in order to allow the data protection system 109 to orchestrate the delivery of data protection keys as a service to end users 102 across organizational boundaries, whereas each organization typically wants to maintain direct control and ownership over the system that generates and stores its data protection keys. Thus, in one embodiment, the data protection system 109 may comprise the key service 110. In one embodiment, the data protection system 109 may not comprise the key service 110 and may only apply security policies without providing cryptographic encryption functionality.

Still referring to FIG. 1, for exemplary purposes, assume that the user 102 wishes to log into the secure service 108 (e.g., customer relationship management software like SALESFORCE®, etc.) using some client software 104 (e.g., a pre-existing, off-the-shelf software product such as an internet browser, etc.) operating on the electronic computing device 103. Thus, in one embodiment, the user 102 trying to access secure service 108 will direct the client software 104 to the service 108, as shown at step 111. In one exemplary instance, this could be providing a Uniform Resource Locator (URL) to a web browser or selecting a saved bookmark for a web application. When the client software 104 attempts to access the secure service 108, at step 112 in one embodiment, the service 108 responds with a requirement that the user 102 provide a valid assertion of identity from a particular identity provider 106. At step 113, the client software 104 connects to the identity provider 106 to provide the requested assertion, allowing the user 102 to authenticate his/herself to the identity provider 106. The user 102 generally authenticates through whatever mechanisms the identity provider supports, which may include username and password credentials, a token generator, or other schemes.

If the user successfully authenticates, at step 114 the identity provider 106 redirects the client software 104 to connect with the identity provider module 107 to confirm the presence/configuration of the client module/SDK 105 on the computing device 103 (e.g., as a second factor along with the credentials provided at step 113 in a multifactor authentication scheme). At step 115, when the client software 104 contacts the identity provider module 107, the client module/SDK 105 requests that the identity provider module 107 provide a certificate with a public key for the identity provider module 107. At step 116, the identity provider module 107 replies with that certificate to the client software 104. Generally, the client module/SDK 105 will use the certificate from the identity provider module 107 to verify that the requests that it transmits and confirmations that it receives are genuine and not malicious or falsely created.

In one embodiment, at step 117, the client software 104 instructs the client module/SDK 105 to provide the confirmation requested by the identity provider module 107. Thus, at step 117, in various embodiments, the client module/SDK 105 sends a request to the data protection system 109 for a cryptographic assertion that the data protection system is installed and operating on the client computing device 103. The request itself may be encrypted using a symmetric key shared between the client module/SDK 105 and the data protection system 109, so the client module also sends a unique device identifier that the data protection system 109 can look up the correct key to decrypt the request from that particular client module/SDK 105. In an alternative instantiation, the client module/SDK 105 could encrypt the request using a public key corresponding to a private key held by the data protection system 109. The data protection system 109 forwards that request, at step 118, to the key service 110 controlled by the enterprise (e.g., the user's employer).

At step 119 in one embodiment, the key service returns to the data protection system 109 an assertion that the computing device 103 has a client module/SDK 105 installed and operating at the time the end user 102 is trying to log into the secure service 108. At step 120 in one embodiment, the data protection system 109 returns the device assertion to the client module/SDK 105. At step 121 in one embodiment, the client module/SDK 105 returns this device assertion to the identity provider module 107. At step 122, the identity provider module 107 generally validates that assertion, and if valid, returns a result to the identity provider 106 indicating success. Although the identity provider module 107 has actually validated the presence and operation of the client module/SDK 105, the identity provider 106 may treat this success as a valid authentication factor in a multi-factor authentication workflow.

Based on the successful multi-factor authentication of the user, the identity provider 106 returns, in one embodiment, an identity assertion at step 122 to the client software 104.

The client software 104, at step 123 in one embodiment, provides this identity assertion to the secure service 108. The secure service 108 then generally allows the user to log in and use the service 108. Because there is assurance that the client module/SDK 105 is installed and operating with the client software 104 on the computing device 103, when the end user 102 later exports data from the secure service 108, there is assurance that the client module/SDK 105 will be able to enforce policy, encrypting and protecting sensitive information. Generally, by confirming the presence/configuration of the client module/SDK 105 on the computing device 103, the system ensures that the user 102, in one embodiment, may only access the secure service 108 with the proper configuration of the client module/SDK 105. In one embodiment, the presence/configuration of the client module/SDK 105 generally functions as a factor in a multifactor authentication scheme to determine whether the user 102 may access the secure service 108. Thus, in one embodiment, the user 102 is generally unable to access the secure system 108 without properly functioning/currently configured client module/SDK 105 (that applies the policies of the data protection system 109), which prevents the user 102 from accessing the sensitive data within the secure service 108 without those controls in place. Alternatively, in one embodiment, the identity provider 106 may be configured to take certain actions if the user 102 cannot pass the multi-factor authentication scheme due to the lack of those controls (e.g., limit access to the third party software, monitor access and log all activity, notify security personnel, etc.).

Referring now to FIG. 2, an exemplary process 200 is shown according to one embodiment of the present disclosure. The exemplary client module process 200 generally is the process 200 by which the client module/SDK 105 creates a cryptographically secure request for the data protection system 109 to validate the presence of the client module/SDK 105. At this point, in one embodiment, step 116 from FIG. 1 has just completed, and the client module/SDK 105 has a certificate with a public key belonging to the identity provider module 107.

Generally, the exemplary client module process 200 begins at step 201, wherein in one embodiment, the client module/SDK 105 extracts the common name from the identity provider module's certificate. Including the common name in the request generally allows the key service 110 to craft the device assertion to be valid with a specific identity provider module 107, precluding it from being maliciously copied and reused with a different service elsewhere.

At step 202, the client module/SDK 105 generally generates a nonce for use with the key service 110. The nonce, in various embodiments, is a random value of sufficient length to be difficult to reproduce by random chance that is unique to each request for validation. The nonce will generally be included in the encrypted data sent to the key service 110 to request a device assertion, in order to protect against the risk that someone could record a legitimate request and replay it later.

At step 203, in various embodiments, the client module/SDK 105 optionally generates a random ephemeral secret key, which will be used to protect a combination of the client module's device identifier and a nonce as part of step 204 so that only the key service 110. In one embodiment, the random ephemeral secret key is a 256-bit symmetric key. In other embodiments, the random ephemeral secret key may be any random number or key, etc. Generally, the device identifier is a unique identifier for the client module/SDK 105. Including the device identifier in the request serves multiple purposes; for example, it allows the recipient to select the correct symmetric encryption keys to protect communications with the client module/SDK 105. The device identifier also may provide the means for the key service 110 to create an assertion that a client module/SDK 105 is installed and running on a particular device 103, uniquely indicated by that device identifier.

In various embodiments, at step 204, the client module/SDK 105 creates an encrypted client data package, comprising the client module's device identifier and the nonce (e.g., generated at step 202), generally encrypted with the ephemeral secret key (e.g., generated at step 203), with the identity provider module's common name (e.g., extracted at step 201) as additional authenticated data (e.g., additional ciphers/hashes that make sure the entire package travels as a singular unit, which, in some embodiments, is a best practice to ensure the strength of the package). Generally, this encrypted client data package provides the information that the key service 110 may need to assert the presence of a client module/SDK 105 on a particular device, with cryptographic assurance of the identity of the client module/SDK 105.

At step 205, in one embodiment, the client module/SDK 105 creates an encrypted package for the key service 110, comprising the ephemeral secret key (e.g., generated in step 203), encrypted under a symmetric key known to the client module/SDK 105 and the key service 110, with the encrypted client data package (e.g., generated in step 204) as additional authenticated data. In one embodiment, encrypting the ephemeral secret key (e.g., generated in step 203) with a symmetric key known to both the client module/SDK 105 and the key service 110 generally ensures that only the key service will be able to access the encrypted client data package (e.g., generated in step 204). Generally, the encrypted package for the key service 110 generated at step 205 comprises the data that the key service 110 may use to generate the assertion of the presence of the client module/SDK 105.

The client module/SDK 105 generally does not communicate directly with the key service 110 (although in one embodiment, when the data protection system 109 comprises the key service 110, the client module/SDK 105 communicates directly with both). Instead, in one embodiment, it sends requests through the data protection system 109, allowing the data protection system 109 to route requests to any one of many key services 110 belonging to different enterprises. Therefore, in the next several steps, in various embodiments, the client module prepares an encrypted data package for the data protection system 109.

At step 206, the client module/SDK 105 generally generates a nonce for use with the data protection system 109. Notably, this nonce, in one embodiment, is a different nonce value than the one generated in step 202 but is still unique to the request. Generally, this nonce is used to prevent an attacker from replaying a request to the data protection system 109 at a later time.

At step 207, in one embodiment, the client module/SDK 105 generates and hashes a unique identifier of the hardware device on which it is running. That unique identifier may generally include a number of attributes such as hardware serial numbers, firmware revisions, identifiers provided by the operating system, or other parameters. In one embodiment, the intent of the unique identifier is to increase confidence that the client module/SDK 105 is running on the expected computing device 103. If the data protection system 109 later determines that the hardware fingerprint it has is incorrect, then, in one embodiment, it could indicate an attempt to forge a request for a device assertion from a different device.

In various embodiments, at step 208, the client module/SDK 105 also generates an encrypted package for the data protection service 109 that permits the data protection service 109 to route the request for device assertion, comprising the nonce (e.g., generated in step 206), the hardware fingerprint hash (e.g., generated in step 207), the common name extracted from the identity provider module's certificate in step 201), and the encrypted package for the key service (e.g., generated in step 205), encrypted under a symmetric key known only to the client device 105 and the data protection system 109, with the client module's device identifier as additional authenticated data. Thus, at step 117, the encrypted package for the data protection service 109 (e.g., generated at step 208), which is the device assertion request, is sent to the data protection service 109.

After transmitting the device assertion request at step 117, the exemplary client module process 200 generally ends thereafter. Accordingly, a description of an exemplary data protection system process, which, in one embodiment, is the next process in the disclosed systems and methods, is described in greater detail below.

Now referring to FIG. 3, an exemplary process 300 is shown according to one embodiment of the present disclosure, wherein the data protection system 109 validates a cryptographically secure device assertion request from the client module/SDK 105 and passes that request to the key service 110. Generally, the exemplary data protection system process 300 begins at step 301, wherein in one embodiment, the data protection system 109 uses the client module's device identifier (e.g., included as additional authenticated data in step 208 from FIG. 2) to select the symmetric key corresponding to the correct client module/SDK 105 so that the data security system 109 may decrypt the device assertion request. At step 302, the data security system 109 generally decrypts the encrypted package for the data security service (e.g., generated in step 208 and sent in step 117 from FIGS. 1 and 2) using the selected symmetric key corresponding to the client module/SDK 105. In one embodiment, the decryption yields a nonce (e.g., generated in step 206), a hardware fingerprint hash (e.g., generated in step 207), the common name of the identity provider module's public key certificate (e.g., extract at step 201), and the encrypted package for the key service 110 (e.g., generated at step 205).

Thus, in one embodiment at step 303, the data security system 109 validates the device assertion request package using the data decrypted at step 302. For example, the data security system 109 checks the nonce (e.g., generated in step 206) to ensure that the request for a device assertion is not a replay of a prior request. The data security system 109 may, in one embodiment, also look up the known fingerprint hash for the client computing device 103 using the device identifier, comparing the two to reduce the risk of a device assertion request being forged from another device. If either of these checks fails, the process continues with step 304, in which the data security system 109 replies with an error code to the client module/SDK 105, effectively ending the protocol sequence and denying the user 102 access to the secure service 108 or resulting in another action as discussed herein (e.g., generating a security alert, etc.). In various embodiments, the data security system 109 may use any of the data items decrypted at step 302 to validate the device assertion request package. In one embodiment, at step 303, the data protection system 109 may also determine, based on one or more predefined policies, whether a device assertion should be provided to the client module/SDK 105 at all (e.g., based on IP address, user identity, secure system that the user is attempting access, etc.).

Generally, if the validation checks pass, then in one embodiment, the process continues with step 118, in which the data security system 109 sends the encrypted key service package (e.g., generated in step 205 and decrypted at step 302), the device identifier for the client module/SDK 105, and the identity provider's certificate common name to the key service 110. After transmitting at step 118, the exemplary data protection system process 300 generally ends thereafter. Accordingly, a description of an exemplary key service process, which, in one embodiment, is the next process in the disclosed systems and methods, is described in greater detail below.

Referring now to FIG. 4, which illustrates, according to one embodiment of the present disclosure, an exemplary process 400 for the key service 110 to validate a cryptographically secure request from the client module/SDK 105 to assert its presence on a client device and to prepare a response with that assertion. Generally, the exemplary key service process 400 begins at step 401, wherein in one embodiment, the key service 110 decrypts the key service package (e.g., generated in step 205 from FIG. 2). At step 402, in various embodiments, the key service 110 validates, from successful decryption, that the key service package is genuine and has not been tampered with since it was generated.

At step 402, in one embodiment, the key service 110 then validates that the decryption was successful, providing the ephemeral secret key (e.g., generated in step 203 from FIG. 2) as well the encrypted client data package (e.g., generated in step 204 and included as authenticated data in the key service package that was generated in step 205 from FIG. 2). If unsuccessful, at step 403 in various embodiments, the key service 110 returns an error code to the data protection system 109, which will then return an error to the client module/SDK 105, ultimately ending the protocol and denying the user 102 access to the secure service 108. In one embodiment, at step 403, instead of returning an error to the client module/SDK 105, the data protection system 109 may take another action such as sending an alert to security personnel, logging the failed decryption and data regarding the same, permitting limited access to the secure system 108, installing software on the device 103 (e.g., for tracking purposes, etc.), etc.

If validated, the process 400 generally continues at step 404, in which the key service 110 decrypts the client data package using the ephemeral secret key (e.g., generated in step 203), yielding the client module's device identifier and a nonce (e.g., generated in step 202). At step 405, in one embodiment, the key service 110 validates that the decryption was successful, in that the additional authenticated data output is the common name of the identity provider module's certificate. Generally, the key service 110 may also check the nonce (e.g., generated in step 202) against previously used nonces to guard against an attacker replaying a previous request for a device assertion. In various embodiments, if either of these checks fails, then, at step 403, the key service 110 returns an error code to the data protection system 109, which will then return an error to the client module/SDK 105, which ultimately ends the protocol and denys the user 102 access to the secure service 108, or another action as discussed herein (e.g., generating a security alert, etc.).

If successful, the process 400 continues at step 406, in which the key service 110, in one embodiment, generates the device assertion, comprising the common name from the identity provider module's certificate, a unique identifier for the key service 110, and a time range of validity for the assertion. Generally, the unique identifier prevents a malicious user from generating a fake assertion and the common name and time range prevent a malicious user from reusing previously generated assertions (e.g., in one embodiment, the time range assures that the assertion is only valid for a specific period of time, after which a new assertion is required). In one embodiment, the key service 110 may include other data items to ensure the security/validity of the device assertion. At step 407, in one embodiment, the key service 110 optionally signs the device assertion using the key service's private key to provide further assurance of the validity of the device assertion.

In one embodiment, at step 408, the key service 110 encrypts the device assertion and the device assertion signature under a symmetric key known only to the key service 110 and the client module/SDK 105 (e.g., in one embodiment, the same symmetric key as used by the client module/SDK 105 at step 205), with the nonce (e.g., generated in step 202) as authenticated data. This encryption generally ensures that the device assertion and signature are readable only by the intended recipient, the client module/SDK 105, even if a network eavesdropper intercepts their communications. At step 119, in one embodiment, the key service 110 returns the encrypted device assertion to the data protection system 109. After returning the encrypted device assertion at step 119, the exemplary key service process 400 generally ends thereafter. Next, a description of an exemplary client module process is described in greater detail below.

Now referring to FIG. 5, an exemplary process 500 is shown according to one embodiment of the present disclosure for the client module/SDK 105 to receive a device assertion from the data protection system 109 and to forward that assertion to the identity provider module 107. Generally, the exemplary client module process 500 begins at step 501, wherein, in one embodiment, the client module/SDK 105 decrypts the encrypted device assertion (e.g., generated at step 408 form FIG. 4) using a symmetric key known only to the key service 110 and the client device 105. The decryption yields the device assertion (e.g., generated at step 406), a signature of the device assertion under the key service's private key (e.g., generated at step 407), with validation of the nonce (e.g., generated in step 202) as additional authenticated data. In one embodiment, at step 121, the client module/SDK 105 sends the assertion, assertion signature, and nonce to the identity provider module 107 and the exemplary client module process 500 ends thereafter. Accordingly, a description of an exemplary identity provider module process, which, in one embodiment, is the next process in the disclosed systems and methods, is described in greater detail below.

Referring now to FIG. 6, an exemplary process 600 is shown according to one embodiment of the present disclosure for the identity provider module 107 to verify a cryptographically secure assertion that the client module/SDK 105 is installed and operating on a computing device 103 and appropriately condition the success of the user's authentication with the identity provider 106. Generally, if the user's authentication is successful (e.g., because the device assertion confirms the presence of the client module/SDK 105), then the user will be able to access the secure service 108 using the client software 104 on the computing device 103. As may be recalled, the device assertion generally comprises the common name from the identity provider module's certificate, a unique identifier for the key service 110, and a time range of validity for the assertion.

The exemplary identity provider module process 600 begins at step 601, wherein in various embodiments, the identity provider module 107 verifies the key service's signature of the device assertion (e.g., generated in step 406 from FIG. 4) and the nonce (e.g., generated in step 202 from FIG. 2). If the signature is not valid, then in one embodiment, the process continues with step 602, in which the identity provider module 107 returns a failure result to the identity provider 106, indicating that it could not assert the presence of the client module/SDK 105 on the end user's computing device 103. This failure generally terminates the protocol, denying the user 102 access to the secure service 108 or resulting in another action as discussed herein (e.g., generating a security alert, etc.).

If the signature validation succeeds, then, in one embodiment, the process 600 continues at step 603, in which the identity provider module 107 validates the signer of the device assertion, ensuring that the assertion was signed by an authorized key service 110. If the identity provider module 107 determines that the signer is not authorized to provide the device assertion, then, in one embodiment, the process 600 continues with step 602, returning a failure result to the identity provider 106, which results in the user 102 being denied access to the secure service 108 or results in another action as discussed herein (e.g., generating a security alert, etc.). If the key service 110 is authorized to provide the device assertion, then, in one embodiment, the process 600 continues with step 604.

At step 604, in various embodiments, the identity provider module 107 checks that it is the intended recipient of the device assertion by comparing the common name from its own certificate to the common name in the device assertion. If the two do not match, then, in one embodiment, it could be an indicator that an attacker is trying to reuse a device assertion that was granted in a different context. If the two names match, then, in one embodiment, it ensures that the device assertion that the key service 110 produced is intended for this identity provider module 107. If the check fails, then, in one embodiment, the process 600 continues with step 602, returning a failure result to the identity provider 106, which results in the user 102 being denied access to the secure service 108 or another action as discussed herein (e.g., generating a security alert, etc.). If the check passes, then, in one embodiment, the process 600 continues with step 605.

At step 605, in one embodiment, the identity provider module 108 checks that the time window included in the device assertion (e.g., generated in step 406 from FIG. 4) against the current time. If the current time is within the time window provided in the device assertion, then, in one embodiment, the check passes. If the current time is outside the time window, then, in one embodiment, it may be an indication of tampering or replay by an attacker. If the current time is outside the time window, then, in one embodiment, the process 600 continues with step 602, returning a failure result to the identity provider 106, which results in the user 102 being denied access to the secure service 108 or another action as discussed herein (e.g., generating a security alert, etc.).

If the check passes, then, in one embodiment, the process 600 continues with step 606, in which the identity provider module 107 returns success to the identity provider 106 and the exemplary identity provider module process 600 ends thereafter.

The identity provider 106, in various embodiments, treats this returned success as an indication of a successful authentication factor in a multi-factor authentication workflow, and if all other factors are successful as well, grants the user 102 an appropriate assertion of identity and authentication to use for access to the secure service 108. Thus, in one embodiment, the user 102 is able to access the secure service 108 by providing confirmation that a currently/properly-configured client module/SDK 105 is operating on the computing device 103 so as to ensure the security of any sensitive data within the secure service 108 (e.g., by ensuring that an extension of the data protection system 109 is operating on the computing device 103). Accordingly, the processes disclosed and described herein generally relate to access of the secure service 108 and not the operation/functionality of the secure service 108 (e.g., the secure service 108 operates regardless of whether the device assertion is provided—the device assertion only permits access to the same).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

What is claimed is:

1. A method for providing access to a secured service, comprising the steps of:

initiating, from an electronic computing device, a multi-factor authentication request to gain access to a secured software service, wherein one factor of the multi-factor authentication request comprises an assertion that a data protection software is operational on the electronic computing device;

initiating and transmitting a validation request from the electronic computing device to a third party system;

receiving, from the third party system, a request for a cryptographic assertion that the data protection software is in fact operational on the electronic computing device;

transmitting, via the electronic computing device, a second request to a data protection system for the cryptographic assertion;

receiving the cryptographic assertion comprising a key service identifier from the data protection system, wherein the cryptographic assertion is performed by the data protection system based at least in part on a symmetric key known only to the electronic computing device and a key service associated with the key service identifier;

transmitting the cryptographic assertion to the third party system;

receiving a confirmation indication at the electronic computing device from the third party system confirming the assertion that the data protection software is in fact operational on the electronic computing device based at least in part on the cryptographic assertion being validated and a determination that an identity provider identifier is valid, that a data protection system identifier is valid, and that a current time is within a validity time-range; and transmitting the confirmation indication to the secured software service to validate the one factor of the multi-factor authentication request and enable access of the electronic computing device to the secured software service.

2. The method of claim 1, wherein another factor of the multi-factor authentication request comprises a user name and a password.

3. The method of claim 2, wherein initiating and transmitting the validation request further comprises providing the another factor of the multi-factor authentication request to the third party system.

4. The method of claim 1, wherein the third party system comprises an identity provider.

5. The method of claim 1, wherein the third party system comprises a data protection system corresponding to the data protection software.

6. A system, comprising:
an electronic computing device that transmits a request for access to a secured service;
the secured service that receives the request for access, wherein the secured service redirects the electronic computing device to an identity provider for confirmation of a presence of a data protection system protecting data on the electronic computing device;
the identity provider that transmits a request for a first assertion for confirmation of the presence of the data protection system to the electronic computing device, wherein the request for the first assertion comprises a cryptographic assertion;
the electronic computing device that:
receives the request for confirmation from the identity provider,
transmits to the data protection system a request for the first assertion of the presence of the data protection system;
the data protection system that:
receives the request for the first assertion from the electronic computing device,
confirms the presence of the data protection system based at least in part on a symmetric key known to a key service associated with a key service identifier and a determination that an identity provider identifier is valid, that a data protection system identifier is valid, and that a current time is within a validity time-range, and
transmits the first assertion comprising the key service identifier to the electronic computing device;
the electronic computing device that receives the first assertion from the data protection system, wherein the electronic computing device transmits the first assertion to the identity provider;
the identity provider that receives the first assertion from the electronic computing device, wherein the identity provider determines that the first assertion confirms the presence of the data protection system and transmits a second assertion to the electronic computing device that will enable access to the secured service by the electronic computing device;
the electronic computing device that receives the second assertion, wherein the electronic computing device transmits the second assertion to the secured service; and the secured service that receives the second assertion from the electronic computing device, wherein the secured service, based on the second assertion, provides access to the secured service by the electronic computing device.

7. The system of claim 6, wherein the identity provider, prior to transmitting the request for confirmation, authenticates the electronic computing device.

8. The system of claim 6, wherein the request for the first assertion comprises a device identifier corresponding to at least one of: unique cryptographic information and the identity provider identifier corresponding to the identity provider.

9. The system of claim 8, wherein the request for the first assertion is encrypted by the electronic computing device prior to transmission to the data protection system.

10. The system of claim 6, wherein the data protection system, after confirming the presence of the data protection system, generates the first assertion.

11. The system of claim 10, wherein the first assertion comprises at least one of: the identity provider identifier, the data protection system identifier corresponding to the data protection system, and the validity time-range corresponding to the first assertion.

12. The system of claim 10, wherein the first assertion is encrypted by the data protection system prior to transmission to the electronic computing device.

13. A method, comprising the steps of:
transmitting, via a first software component, a request for access to a secured service;
receiving, via a second software component, the request for access to the secured service and redirecting to an identity provider for confirmation of a presence of a data protection system protecting data on an electronic computing device;
transmitting, via the identity provider, a second request for confirmation of the presence of the data protection system;
receiving, via the first software component, the second request for confirmation and transmitting a third request for a first assertion of the presence of the data protection system to a third software component, wherein the third request for the first assertion comprises a cryptographic assertion;
receiving, via the third software component, the third request for the first assertion;
confirming the presence of the data protection system based at least in part on a symmetric key known to a key service associated with a key service identifier and a determination that an identity provider identifier is valid, that a data protection system identifier is valid, and that a current time is within a validity time-range;
transmitting, via the third software component, the first assertion comprising the key service identifier to the first software component;
receiving, via the first software component, the first assertion and transmitting the first assertion to the identity provider;
receiving, via the identity provider, the first assertion;
determining that the first assertion confirms the presence of the data protection system;
transmitting, via the identity provider, a second assertion that will enable access to the secured service by the electronic computing device;
receiving, via the first software component, the second assertion and transmitting the second assertion to the secured service; and receiving, via the secured service, the second assertion and, based on the second assertion, providing access to the secured service.

14. The method of claim 13, further comprising the step of, prior to transmitting the second request for confirmation, authenticating the electronic computing device.

15. The method of claim 13, wherein the third request for the first assertion comprises a device identifier corresponding to the electronic computing device, unique cryptographic information, and the identity provider identifier corresponding to the identity provider.

16. The method of claim 15, wherein the third request for the first assertion is encrypted prior to transmission.

17. The method of claim 13, wherein the first assertion comprises the identity provider identifier, the data protection system identifier corresponding to the data protection system, and the validity time-range corresponding to the first assertion.

18. The method of claim 17, wherein the first assertion is encrypted prior to transmission.

19. A method, comprising the steps of:
receiving a request from an electronic computing device to access a secured service;
transmitting a request to the electronic computing device for a cryptographic assertion that a presence of a data protection system is in fact operational on the electronic computing device, wherein the cryptographic assertion is to be performed by the data protection system based at least in part on a symmetric key known only to the electronic computing device and a key service associated with a key service identifier;
receiving the cryptographic assertion that the presence of the data protection system is in fact operational on the electronic computing device, wherein the cryptographic assertion comprises the key service identifier;
validating that the cryptographic assertion confirms the presence on the electronic computing device of the data protection system based at least in part on the key service and the cryptographic assertion comprising the key service identifier and a determination that an identity provider identifier is valid, that a data protection system identifier is valid, and that a current time is within a validity time-range; and
providing access to the secured service via the electronic computing device.

20. The method of claim 19, wherein the secured service performs the step of transmitting the request for the cryptographic assertion that the data protection system is in fact operational on the electronic computing device.

21. The method of claim 19, wherein an identity provider performs the step of transmitting the request for the cryptographic assertion that the data protection system is in fact operational on the electronic computing device.

22. The method of claim 19, wherein the presence of the data protection system comprises a software development kit (SDK).

23. The method of claim 22, wherein the SDK comprises a JavaScript SDK.

24. The method of claim 19, wherein the presence of the data protection system comprises a plugin installed in an internet browser on the electronic computing device.

25. The method of claim 19, wherein the presence of the data protection system comprises an up-to-date and operational version of the data protection system.

26. A system, comprising:
an electronic computing device that transmits a request for access to a secured service;
the secured service that receives the request for access, wherein the secured service transmits to the electronic computing device a second request for confirmation of a presence of a data protection system protecting data on the electronic computing device;
the electronic computing device that receives the second request for confirmation from the secured service, wherein the electronic computing device transmits to the data protection system a third request for a cryptographic assertion of the presence of the data protection system;
the data protection system that receives the third request for the cryptographic assertion from the electronic computing device, wherein the data protection system confirms the presence of the data protection system based at least in part on a symmetric key known only to the electronic computing device and a key service associated with a key service identifier and transmits the cryptographic assertion comprising the key service identifier to the electronic computing device;
the electronic computing device that receives the cryptographic assertion comprising the key service identifier from the data protection system, wherein the electronic computing device transmits the cryptographic assertion to the secured service; and
the secured service that receives the cryptographic assertion from the electronic computing device, wherein the secured service:
determines that the cryptographic assertion confirms the presence of the data protection system based on a determination that a secured service identifier is valid, that a data protection system identifier is valid, and that a current time is within a validity time-range; and
provides access to the secured service by the electronic computing device.

27. The system of claim 26, wherein the secured service, after receiving the request for access, authenticates the electronic computing device.

28. The system of claim 26, wherein the third request for the cryptographic assertion comprises a device identifier corresponding to the electronic computing device, unique cryptographic information, and the secured service identifier corresponding to the secured service.

29. The system of claim 28, wherein the third request for the cryptographic assertion is encrypted by the electronic computing device prior to transmission to the data protection system.

30. The system of claim 26, wherein the data protection system, after confirming the presence of the data protection system, generates the cryptographic assertion.

31. The system of claim 30, wherein the cryptographic assertion is encrypted by the data protection system prior to transmission to the electronic computing device.

* * * * *